US010582022B2

(12) United States Patent
Momchilov et al.

(10) Patent No.: US 10,582,022 B2
(45) Date of Patent: Mar. 3, 2020

(54) ADAPTIVE SESSION RELIABILITY OVER MULTIPLE TRANSPORTS

(71) Applicant: Citrix Systems, Inc., Fort Lauderdale, FL (US)

(72) Inventors: Georgy Momchilov, Parkland, FL (US); Terry Treder, Delray Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 181 days.

(21) Appl. No.: 15/598,912

(22) Filed: May 18, 2017

(65) Prior Publication Data

US 2017/0339258 A1 Nov. 23, 2017

Related U.S. Application Data

(60) Provisional application No. 62/339,557, filed on May 20, 2016.

(51) Int. Cl.
*H04L 29/06* (2006.01)
*H04L 29/14* (2006.01)
*H04L 12/801* (2013.01)

(52) U.S. Cl.
CPC ............ *H04L 69/165* (2013.01); *H04L 69/16* (2013.01); *H04L 69/161* (2013.01);
(Continued)

(58) Field of Classification Search
CPC .................................. H04L 69/16; H04L 69/40
See application file for complete search history.

(56) References Cited

U.S. PATENT DOCUMENTS 7,539,127 B1 * 5/2009 Shaffer ............... H04L 65/1083
370/216
8,504,818 B2 * 8/2013 Rao ........................ H04L 63/08
713/150
(Continued)

FOREIGN PATENT DOCUMENTS

WO 2010042708 A2 4/2010

OTHER PUBLICATIONS

T. Pauly, S. Touati, R. Mantha, TCP Encapsulation of IKEv2 and IPSec Packets, 2016.
(Continued)

*Primary Examiner* — Lashonda T Jacobs
(74) *Attorney, Agent, or Firm* — Banner & Witcoff, Ltd.

(57) ABSTRACT

Methods, systems, and computer-readable media for providing reliable switching between different transport protocols (e.g., TCP and UDP) are presented herein. In some embodiments, a computing platform may stop transmission over a transport protocol. Subsequently, the computing platform may synchronize buffers between a client and a host. For example, the buffer may include acknowledgments for undelivered reliable packets between the client and the host. Next, the computing platform may resume transmission over a different transport protocol. In some embodiments, when establishing an initial connection between a client and a host, connections may be attempted in parallel over multiple transport protocols. After a connection over a first transport protocol is established, if a connection is later established over a second transport protocol, the connection may be transitioned to the second transport protocol. Also, ticketing semantics may be preserved in the switch between the different transport protocols.

20 Claims, 10 Drawing Sheets

(52) U.S. Cl.
CPC .......... *H04L 69/162* (2013.01); *H04L 69/163* (2013.01); *H04L 69/164* (2013.01); *H04L 69/40* (2013.01); *H04L 47/196* (2013.01)

(56) References Cited

U.S. PATENT DOCUMENTS

| | | | | |
|---|---|---|---|---|
| 8,627,449 | B2* | 1/2014 | Parla | H04L 63/0272 709/227 |
| 8,874,791 | B2* | 10/2014 | Panasyuk | G06F 21/31 709/219 |
| 9,185,133 | B2* | 11/2015 | Keoh | H04L 63/166 |
| 9,438,448 | B2* | 9/2016 | Tripathi | H04L 41/0654 |
| 2002/0078208 | A1* | 6/2002 | Crump | H04L 29/06 709/227 |
| 2002/0169894 | A1* | 11/2002 | Takla | H04L 69/08 709/250 |
| 2003/0231598 | A1* | 12/2003 | Venkatarannan | H04M 15/00 370/252 |
| 2004/0148417 | A1* | 7/2004 | Roh | H04L 29/06 709/230 |
| 2004/0215799 | A1* | 10/2004 | Lehmann, Jr. | H04L 12/1827 709/230 |
| 2004/0243800 | A1* | 12/2004 | Langworthy | H04L 69/16 713/151 |
| 2005/0198379 | A1* | 9/2005 | Panasyuk | G06F 21/31 709/239 |
| 2005/0198380 | A1* | 9/2005 | Panasyuk | H04L 12/4633 709/239 |
| 2007/0094723 | A1* | 4/2007 | Short | H04L 69/16 726/14 |
| 2009/0238077 | A1* | 9/2009 | Bajpay | H04L 41/0681 370/241 |
| 2010/0251052 | A1* | 9/2010 | Yarvis | H04L 1/08 714/748 |
| 2011/0099623 | A1* | 4/2011 | Garrard | H04L 63/126 726/14 |
| 2012/0079001 | A1* | 3/2012 | Chincisan | H04L 12/40013 709/203 |
| 2012/0079323 | A1* | 3/2012 | Chincisan | H04L 1/1642 714/18 |
| 2014/0258705 | A1* | 9/2014 | Roskind | H04L 63/029 713/150 |
| 2015/0256654 | A1 | 9/2015 | Oguchi | |

OTHER PUBLICATIONS

Oct. 9, 2017—(EP) International Search Report—App PCT/US2017/033528.
Nov. 29, 2018—(PCT/US) Preliminary Report on Patentability—App 2017/033528.
WebAssembly, GitHub, Mar. 31, 2016, https://github.com/WebAssembly.
UDT: Breaking the Data Transfer Bottleneck, May 2, 2016, http://udt.sourceforge.net/.
Arch Linux Forums, May 2, 2016, https://bbs.archlinux.org/viewtopic.php?id=200236.
Wikipedia Advanced Encryption Standard, May 2, 2016, https://en.wikipedia.org/wiki/Advanced_Encryption_Standard.
New Features of Open VPN 2.1 and 2.2 | PACKT Books, May 2, 2016, https://www.packtpub.com/books/content/new-features-openvpn-21-and-22.
CiscoPress, WLAN Design: Range, Performance, and Roam Considerations, May 2, 2016, http://www.ciscopress.com/articles/printerfriendly/1613796.

* cited by examiner

| Protocol Ack State | Ticket State |
|---|---|
| Unsent | Unsent |
| Unknown | Unknown |
| Delivered | Delivered |
| Timeout | Unknown |
| Connection broken or timeout before packet sent | Lost |
| Connection broken or timeout after packet sent | Unknown |

1002, 1006, 1010, 1014, 1018, 1022 (left labels); 1004, 1008, 1012, 1016, 1020, 1024 (right labels)

FIG. 10

ADAPTIVE SESSION RELIABILITY OVER MULTIPLE TRANSPORTS

FIELD

Aspects of the disclosure relate to computer hardware and software. In particular, one or more aspects of the disclosure generally relate to computer hardware and software for providing a network session layer that adaptively, transparently, and/or seamlessly switches between transport protocols (e.g., Transmission Control Protocol (TCP) and User Datagram Protocol (UDP), among others).

BACKGROUND

If available, and depending on network conditions, UDP may be more performant in terms of throughput and responsiveness than TCP. But many networks are configured for use of TCP alone, and may block UDP. Therefore, a solution is needed for reliably switching between UDP and TCP, so that the benefits of UDP may be realized when UDP is available, and TCP may be used when UDP is not available.

SUMMARY

Aspects of the disclosure provide efficient, effective, convenient, and scalable ways of addressing these and/or other issues using a network session layer for adaptive transparent switching between different transport protocols, such as TCP and UDP. Switching may be performed based on connectivity. Switching between different transport protocols may change protocols above the transport layer, such as an encryption layer (e.g., SSL, DTLS, secure ICA, Advanced Encryption Standard (AES), or the like). Switching between different transport protocols may also use different proxy protocols while traversing proxies or authenticating to gateways (e.g., CGP, SOCKS for TCP, STUN and/or TURN for UDP). Additionally, a system configured to switch between different transport protocols may expose both reliable and unreliable data transmission semantics to applications, even when reliable transport (e.g., TCP) is substituted for unreliable transport (e.g., UDP). In some embodiments, a client may optimize an initial connection time to a host by attempting both UDP and TCP connections in parallel. Additionally or alternatively, some systems may optimize performance by continuing to attempt to use UDP, even if UDP was previously unavailable.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which:

FIG. 10 depicts an illustrative mapping of a protocol acknowledgment state to a ticket state in accordance with one or more example embodiments.

DETAILED DESCRIPTION

In the following description of the various embodiments, reference is made to the accompanying drawings identified above and that form a part hereof, and in which are shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As noted above, certain embodiments are discussed herein that relate to switching between different transport protocols. Before discussing these concepts in greater detail, however, several examples of a computing device that may be used in implementing and/or otherwise providing various aspects of the disclosure will first be discussed with respect to FIG. 1.

Figure 1:
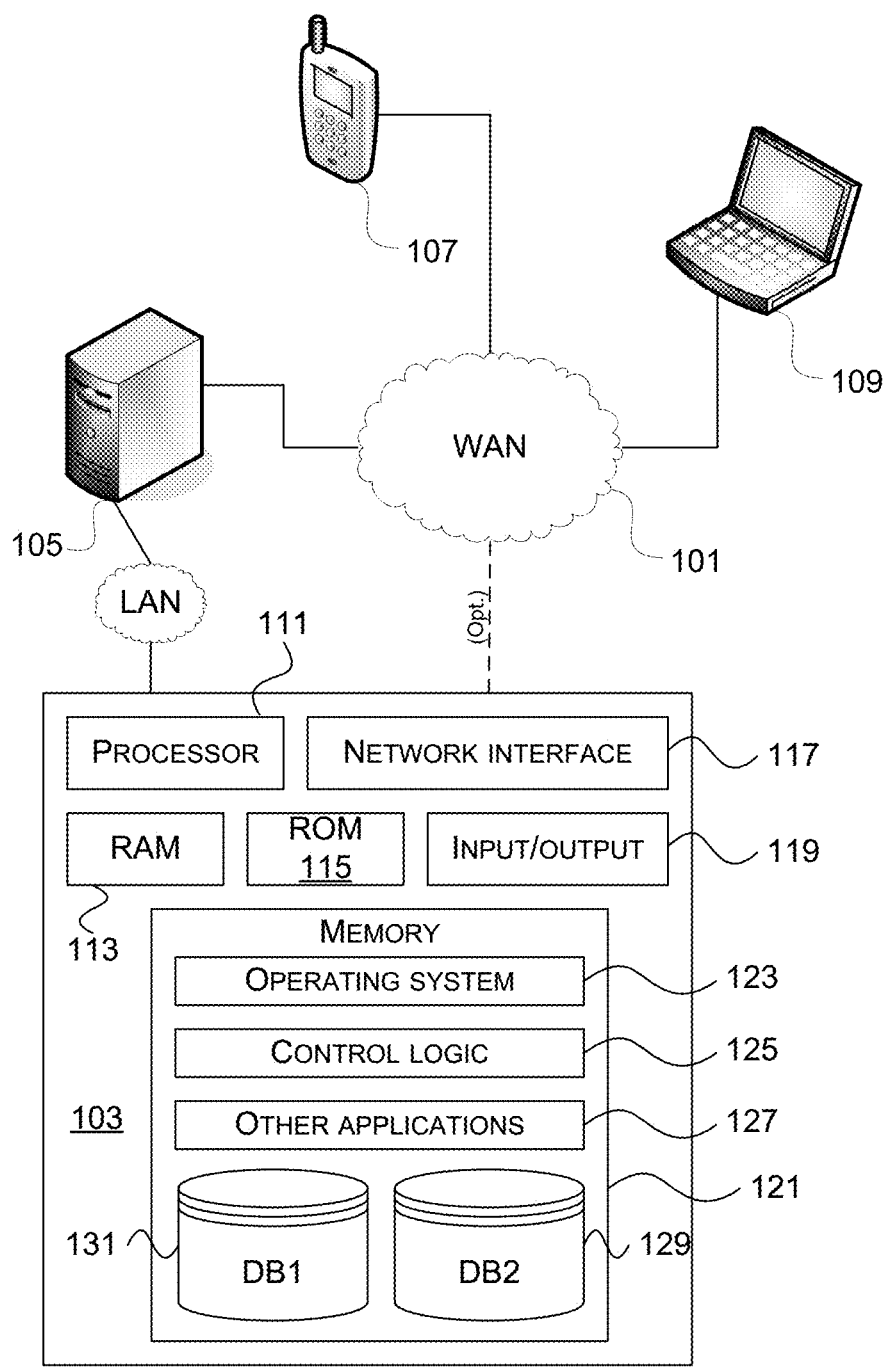
FIG. 1 depicts an illustrative computer system architecture that may be used in accordance with one or more illustrative aspects described herein.

Computer software, hardware, and networks may be utilized in a variety of different system environments, including standalone, networked, remote-access (e.g., remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
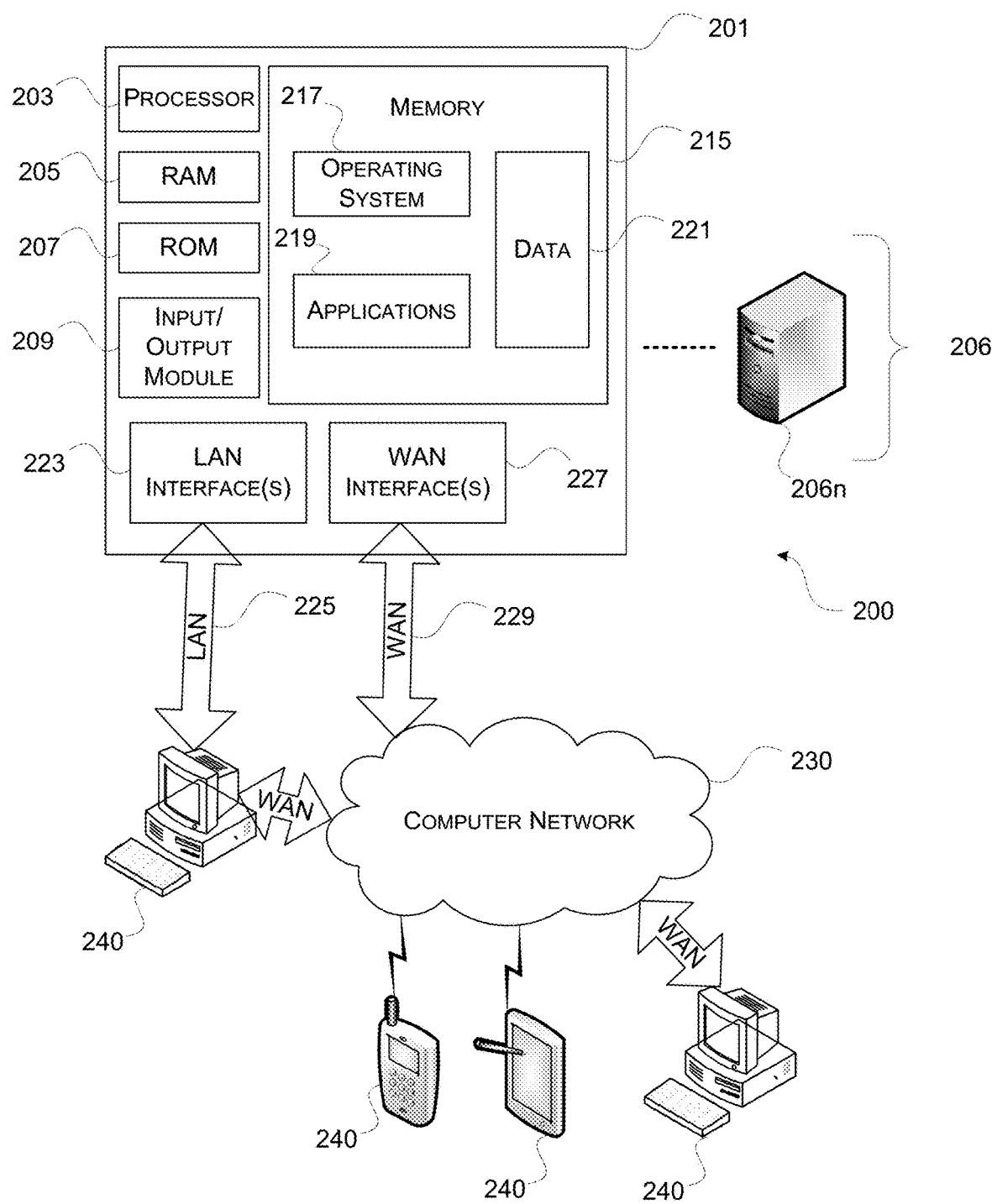
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206c hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Having discussed several examples of the computing system architecture that may be used in providing and/or implementing various aspects of the disclosure, a number of embodiments will now be discussed in greater detail. In particular, and as introduced above, some aspects of the disclosure generally relate to switching between different transport protocols. In the description below, various examples illustrating how switching between different transport protocols may be performed in accordance with one or more embodiments will be discussed.

Figure 3:
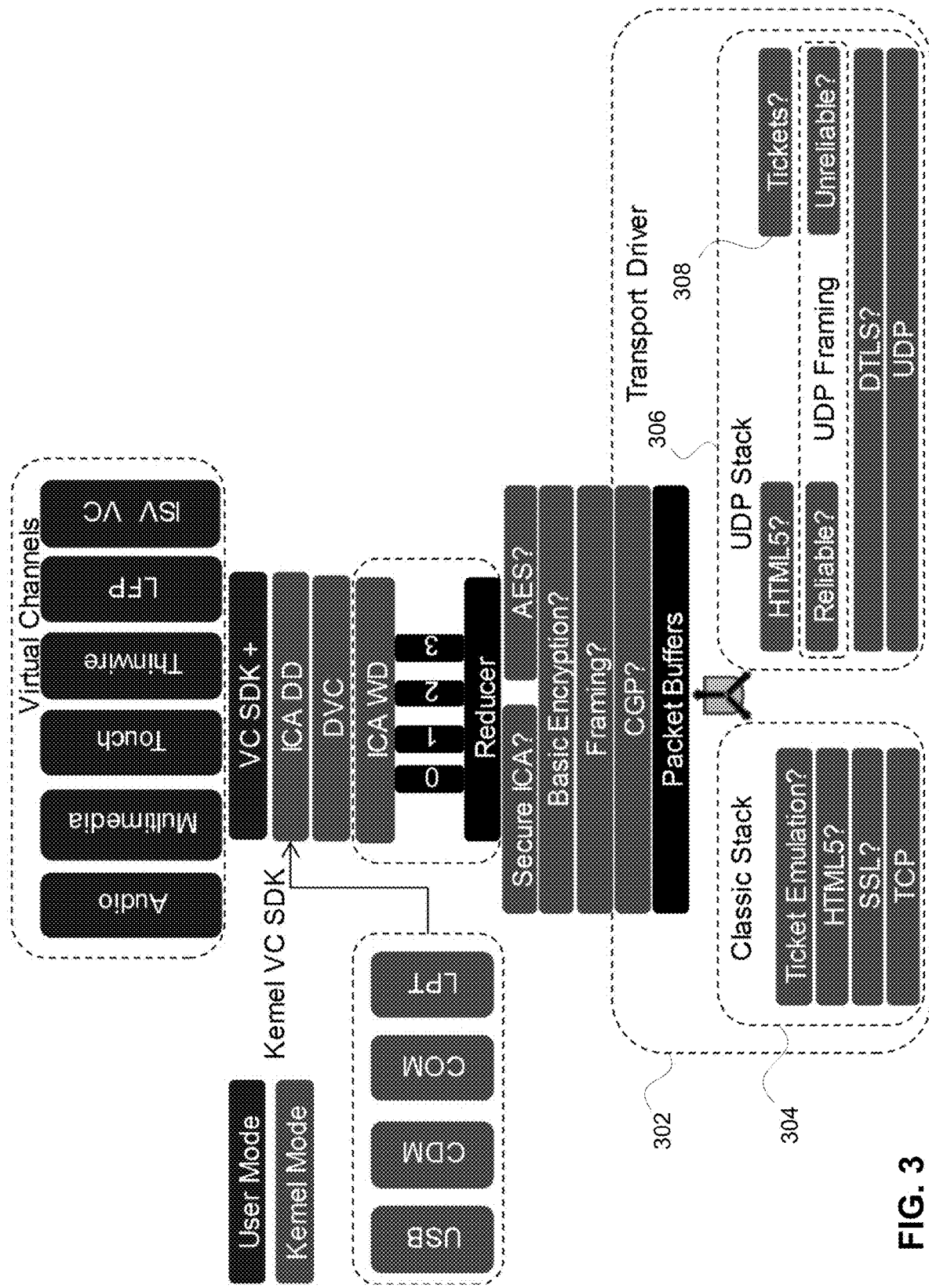
FIG. 3 depicts an illustrative architecture for a computing environment for switching between different transport protocols in accordance with one or more example embodiments.

FIG. 3 depicts an example of an architecture that may be used for transparent switching between different transport protocols in accordance with one or more example embodiments. Referring to FIG. 3, an example architecture that implements one or more aspects of the disclosure is illustrated.

The architecture may be implemented on one or more of a client and/or server or host (e.g., the architecture may be a mirror architecture). When implemented on a client, the client may initiate a connection with a server or host, detect connection availability, detect a dropped connection, and/or attempt to recreate a transport.

The architecture may include a transport driver (e.g., transport driver 302). The transport driver may include a classic stack (e.g., classic stack 304), which may provide for transmissions over TCP, and a UDP stack (e.g., UDP stack 306), which may provide for transmissions over UDP.

The classic stack may include the TCP transport layer, and also include protocols above the TCP layer that are specific to TCP (e.g., that require use of the TCP transport protocol, that do not function on UDP, or that require a particular configuration based on the use of TCP). Examples of additional layers within the classic stack may include encryption (e.g., SSL) and HTML5 layers.

The TCP stack may support reliable semantics by default. Because a Common Gateway Protocol (CGP) connection may drop and never recover, or CGP could be in the process of recovering, or a process of underlying transport switch to UDP may be in progress, unreliable semantics may be simulated via a ticket emulation layer on top of the classic TCP stack.

The UDP stack may include the UDP transport layer, and also include protocols above the UDP layer that may be specific to UDP (e.g., that require the use of the UDP transport protocol, that do not function on TCP, and/or that require a particular configuration based on the use of UDP). Examples of additional layers within the UDP stack may include encryption (e.g., DTLS) and HTML5 layers. Encryption (e.g., DTLS) may be run directly on top of UDP. The HTML5 protocol layer may require reliable transport and might not be run directly on top of UDP.

The UDP stack may include a UDP Framing layer. The UDP Framing layer may provide data transmission synchronization/locking, tight packing, flow control, and/or congestion control. The UDP framing protocol for reliable (e.g., stream oriented or message oriented) and unreliable (e.g., message oriented) delivery may be run on top of encryption. The framing layer may provide framing for reliable or unreliable transmissions. For example, some types of UDP framing protocols may be reliable (e.g., RUDP, UDT, Citrix Framehawk, Citrix Enlightened Data Transport (EDT)), while other types of UDP framing protocols may be unreliable (e.g., Citrix Framehawk, Citrix EDT). Citrix Framehawk and Citrix EDT may provide options for both reliable and unreliable transmission semantics. "Reliable" in this context means that the transport protocol provides guaranteed in-order packet delivery.

In some embodiments, CGP may operate over a reliable transport (e.g., TCP). In some instances, however, a reliable transport (e.g., TCP) may be interruptible. Session Reliability (SR) may be built into CGP for recovery from a broken transport connection. If the transport connection is terminated because of network errors and the SR mechanism is enabled, the client may try to open a new transport connection and recover a session state. SR may be based on a standard sliding window algorithm. In some embodiments, one or both of a client and host may buffer packets.

The UDP stack may also include a ticket layer (e.g., ticket layer 308). The UDP stack may support reliable (e.g., stream or message oriented) semantics as well as unreliable (e.g., message oriented) semantics. This may be over a single UDP socket. Ticketing may be built on top of the unreliable transmission. Ticketing may be used to provide information on the status of transmission of particular packets. For example, higher-level layers may receive ticket information to check on particular packets.

In some embodiments, when connecting via a gateway, CGP may also be used as an authorization protocol and may present a Secure Ticket Authority (STA) ticket to a gateway (e.g., Citrix NetScaler Gateway (NSG)) to authenticate. The STA ticket may be initially issued and securely stored by a STA service. During authentication, the gateway, e.g., Citrix NSG, may validate the STA ticket with the STA service. If authentication is successful, the gateway may authorize the network connection to the remote server 206a (ICA host). A new STA ticket may be issued by the STA service to allow re-authentication in case the connection is later broken.

According to some aspects, CGP may support a reconnect ticket (e.g., CGP cookie), which may be an opaque token. The Independent Computing Architecture (ICA) host (e.g., XenApp/XenDesktop) may issue the reconnect ticket to the ICA client (e.g., client agent) after the initial connection and authentication to a session. Following a transport reconnect, the ICA client (e.g., client agent) may present the reconnect ticket over CGP to the ICA host for authentication to the same session. This Single Sign On (SSO) method may provide for seamless user experience during reconnects. If the reconnect ticket is valid, the ICA host may then issue a new (rolling) reconnect ticket. This may provide for improved security of the connection.

The transport driver (e.g., transport driver 302) may include, above the classic stack (e.g., classic stack 304) and the UDP stack (e.g., UDP stack 306), packet buffers. The packet buffers may be used to buffer packets, beginning-of-stream markers, and/or end-of-stream markers (e.g., when switching from one transport protocol to another transport protocol). A common CGP protocol module may keep a circular buffer of all packets sent with reliable semantics. CGP may acknowledge these packets before removing them from the buffer.

Packets sent with unreliable semantics might not be kept by CGP buffers. A ticket may be given via the virtual channel interface to the application, which may allow the application to query the packet state (unsent, unknown, delivered, lost). In this case, the application may keep the data buffer so the application may later decide whether to retransmit the packet or not. Tickets may be issued only for packets sent with unreliable semantics.

The transport driver may include a Common Gateway Protocol (CGP) module. The CGP module may implement a CGP protocol. As illustrated in FIG. 3, the CGP module may be the lowest protocol layer common to both TCP- and UDP-based stacks. In some embodiments, switching between transport protocols may take place completely within the transport driver, and might not be visible to layers above the transport driver. The CGP module, in some embodiments, may perform one or more steps of one or more algorithms described herein for switching transport protocols.

In some embodiments, the CGP module or the use of the CGP protocol may be optional. For example, if CGP is not enabled, the CGP module might not be included in the architecture, or may serve as a pass-through protocol driver, and thereby perform one or more steps of one or more algorithms described herein for switching transport protocols.

The architecture may include a framing layer on top of the CGP layer.

The architecture may include a basic encryption layer on top of the framing layer. The encryption layer may be different from a standard network encryption layer provided within one or more of the classic stack and the UDP stack. For example, on top of the basic encryption layer may be a Secure ICA layer and/or an AES encryption layer.

The architecture may include one or more layers that may provide for passing data between server and clients (e.g., Independent Computing Architecture (ICA)). For example, the architecture may include an ICA WinStation (WD) layer, which may include a Reducer, e.g., a type of data compressor. The ICA WD layer may determine and/or enforce virtual channel priority. The ICA WD layer may provide compression and/or reducing per virtual channel. The ICA WD layer may measure and/or enforce bandwidth and/or latency of a connection and/or an individual virtual channel. The ICA WD layer may receive user input (e.g., keyboard, mouse, touch). The ICA WD layer may provide session recording.

The architecture may include a Dynamic Virtual Channels (DVC) layer, which may be included on top of the ICA WD layer. The DVC layer may enable an application to open multiple instances of a virtual channel and may provide automatic multiplexing of data streams from the multiple instances of a virtual channel. The DVC layer may provide automatic data fragmentation of large virtual channel data writes into smaller packets.

The architecture may provide an ICA Device Driver (DD) layer, which may be on top of the DVC layer. The ICA DD layer may receive input from one or more sources, such as virtual channel sources for Universal Serial Bus (USB), Client Drive Mapping (CDM), Client COM Port Mapping (COM), Line Print Terminal (LPT), Audio, Multimedia, Touch Input, Graphics, and the like.

The architecture may, in some embodiments, operate in a kernel mode or a user mode. The architecture may include one or more different layers when operating in kernel mode versus user mode.

The architecture may include a virtual channel software development kit (SDK). The virtual channel SDK may include one or more tools that allow virtual channels to interface with lower-level protocols or layers. For example, the virtual channel SDK may include one or more application programming interfaces (API). Some APIs may provide for different types of packets to be sent (e.g., reliable, unreliable (e.g., fire-and-forget), unreliable with ticketing (e.g., enlightened)).

The architecture may include one or more virtual channels (e.g., Audio, Multimedia, Touch, Graphics (e.g., Thinwire), Lightweight Framebuffer Protocol (LFP), ISV virtual channel, etc.). The virtual channels may use an extended virtual channel interface to send both reliable and non-reliable data. Non-reliable data may be sent in fire-and-forget mode (e.g., Audio data).

LFP is an example of an "enlightened" Virtual Channel that embraces uncertainty and performs a technology specific optimization. Some virtual channels may use a combination of reliable and non-reliable transmission. For example, the Multimedia VC may send video key frames reliably, while intermediary frames unreliably. Another example is a Multi-touch VC, which may send touch-down and touch-up events reliably, while touches in between may be sent unreliably. Since touch information is very lightweight, in a current packet it may send not just the current but also the previous touches. Thus, if a previous packet is lost, both the current and old touch events could (with higher probability) still be delivered with the current packet, resulting in a smoother touch curve, which is also more interactive compared to sending all packets reliably (with acks and packet retransmission).

In some embodiments, as discussed above, tickets may be used to track in real time the state of individual packets (e.g., if they have been delivered or lost). In some embodiments, based on the ticket state of individual packets, a virtual channel (e.g., LFP) may perform queuing and tossing of graphics frames over the network. In some embodiments, even if the underlying transport switches from UDP to TCP, the ticketing semantics may be preserved. This may allow for the change in transport to avoid affecting the operation of LFP or the user experience. In some embodiments, in order to preserve consistent semantics regardless of the underlying transport protocol being used, a ticketing scheme may be used regardless of the underlying transport protocol. More details about one potential embodiment of a mapping that may be used in a ticketing scheme is discussed in connection with FIG. 10.

FIG. 10 depicts an illustrative mapping between a protocol acknowledgment state and a ticket state.

In some embodiments, packets that are sent unreliably may be acknowledged independently from CGP acknowledgments (e.g., using separate sequence numbers over a UDP framing protocol). These acknowledgments may be used to update a state of a ticket and/or guide application semantics and performance. For example, flow control, queuing and tossing, a video rate (e.g., frames-per-second (FPS)), an audio sampling rate (e.g., samples-per-second (SPS)), or the like may be dependent on or adjusted based on a protocol acknowledgment state.

In some embodiments, a method for preserving unreliability semantics of ticketing over a reliable protocol (e.g., TCP) may be performed. Specifically, packets sent with unreliable semantics may have corresponding tickets that are issued or available to applications. These tickets may be issued and/or updated for access by the applications, even when transmission of the packets is being performed over a reliable protocol (e.g., TCP), for which a ticket might not otherwise be issued.

Preserving both reliable and unreliable semantics to applications regardless of underlying transport may allow for separation of concerns. For example, if the underlying transport switches from UDP to TCP, it may be beneficial if the ticketing semantics exposed via the virtual channel interface are preserved without affecting the operation of enlightened VCs (e.g., LFP and the user experience). If the ticketing semantics are not preserved, it may be a large burden to an application (e.g., the LFP Virtual Driver would have to support two completely different semantics and to have to switch on demand between them).

If a ticketing scheme is exposed to higher-level applications, and a transport protocol that might not otherwise use a ticketing scheme is being used for communication, the CGP layer may determine a ticket state to provide to an application based on a protocol acknowledgment state of a packet sent using TCP.

A ticket state returned to an application may be one or more of: unsent (1004), unknown (e.g., sent, in transit) (1008), delivered (e.g., received) (1012), lost (1020), or unknown (1008, 1016, 1024). A protocol acknowledgment state may be one or more of: unsent (1002), unknown (1006), delivered (1010), timeout (1014), connection broken or timeout before packet sent (1018), or connection broken or timeout after packet sent (1022).

For example, if a protocol acknowledgment state is unsent (1002), the corresponding ticket state may be unsent (1004).

If a protocol acknowledgment state is unknown (1006), the corresponding ticket state may be unknown (1008).

If a protocol acknowledgment state is delivered (1010), the corresponding ticket state may be delivered (1012). In some embodiments, TCP acknowledgment(s) and/or CGP acknowledgment(s) may be used to determine in real-time (or close to real-time) if a packet was delivered, and therefore if a protocol acknowledgment state should be delivered (1010). If the connection breaks before the client has read the packet off the TCP stack into the CGP layer, the packet may be "lost" to CGP. In addition, while going through a gateway or proxy, the TCP acknowledgement might not provide end-to-end delivery status. In some embodiments, both the TCP acknowledgment and the CGP acknowledgment may be used, which may allow for distinguishing between packets delivered and packets consumed.

If a protocol acknowledgment state is timeout (1014), the corresponding ticket state may be unknown (1016). If a protocol acknowledgment state is connection broken or timeout before packet sent (1018), the corresponding ticket state may be lost (1020).

If a protocol acknowledgment state is connection broken or timeout after packet sent (1022), the corresponding ticket state may be unknown (1024). In this situation, the packet might not necessarily be lost, because CGP reconnect may occur. There may be a race condition (e.g., a race to send the packet before the connection is broken or a timeout occurs). Examining CGP acknowledgments (e.g., instead of or in addition to TCP acknowledgments) may provide robust semantics, and solve the race condition, but might result in slightly slower ticket state updates.

In some embodiments, rather than implement any acknowledgments over TCP or performing any mapping between protocol acknowledgment state and ticket state, the ticket state unknown (1008) may simply always be returned to an application.

Figure 4:
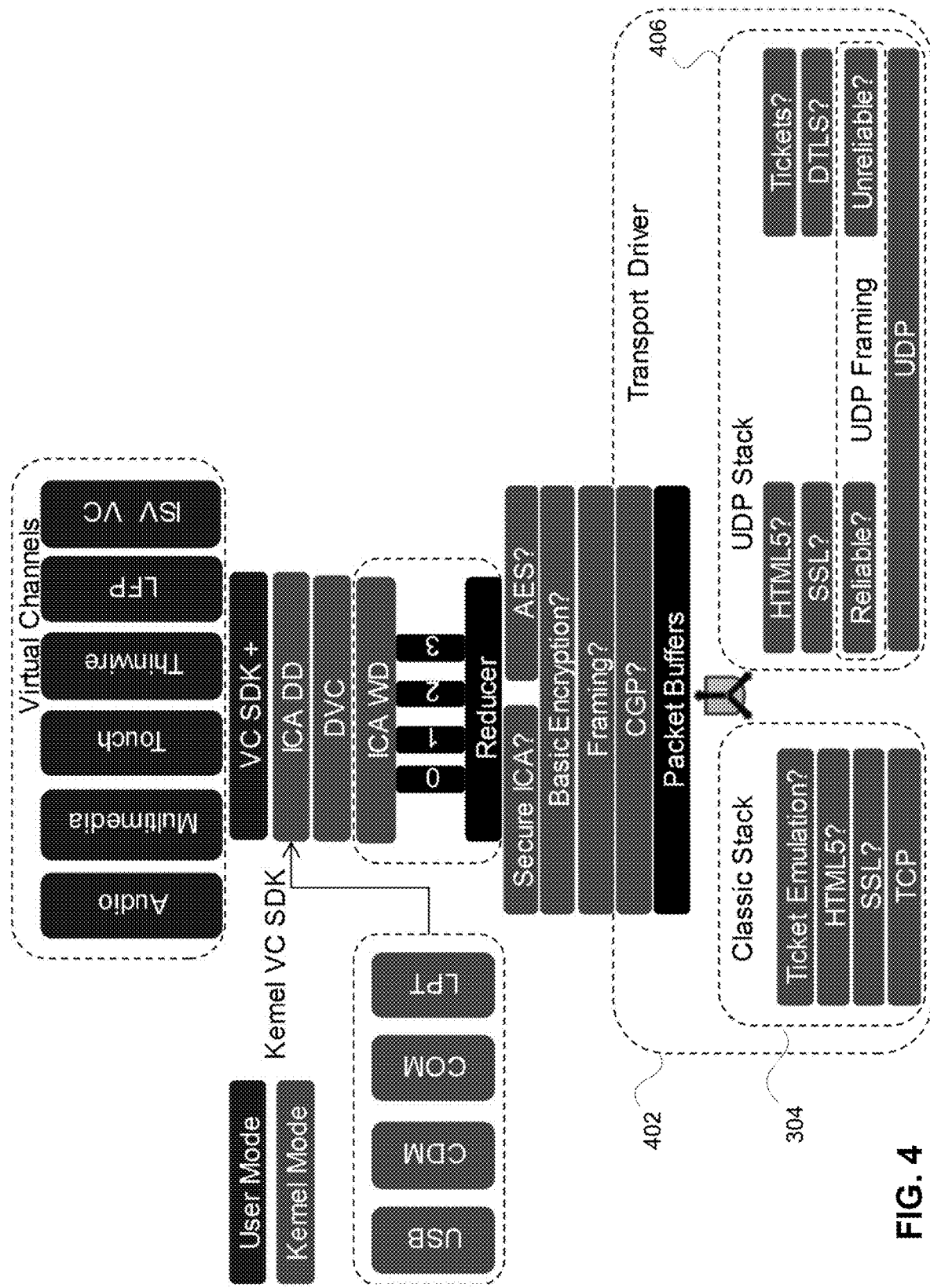
FIG. 4 depicts an illustrative architecture for a computing environment for switching between different transport protocols in accordance with one or more example embodiments.

FIG. 4 depicts another example of an architecture that may be used for transparent switching between different transport protocols in accordance with one or more example embodiments. Some elements of the architecture depicted in FIG. 4 may be similar to elements of the architecture depicted in FIG. 3.

Transport driver 402 may include a classic stack that may be similar to the classic stack depicted in FIG. 3 (e.g., classic stack 304). Transport driver 402 may include a UDP stack (e.g., UDP stack 406), which may be different from the UDP stack depicted in FIG. 3 (e.g., UDP stack 306).

Specifically, encryption might not be run directly on top of UDP. Instead, the UDP framing protocol for reliable and unreliable delivery may be run directly on top of UDP. Then, encryption for reliable delivery (e.g., SSL/TLS) may be run on top of the reliable delivery UDP framing protocol, while encryption for unreliable delivery (e.g., DTLS) may be run on top of the unreliable delivery UDP framing protocol. The HTML5 protocol layer may require reliable transport and may be run on top of the encryption for reliable delivery (e.g., SSL/TLS).

The architecture depicted in FIG. 4 may allow for the application of different encryption techniques and strengths on the different streams. For example, the Kernel Winsock API from Microsoft (KWS) currently supports only DTLS1.0, which may be equivalent to TLS1.1. Some Common Criteria security evaluations may require support for TLS1.2 and DTLS1.2. In addition, TLS1.3 may become a future Common Criteria requirement. With the architecture depicted in FIG. 4, a Windows Kernel transport driver implementation based on Microsoft KWS may have the option of using TLS1.2 for reliable streams and DTLS1.0 for unreliable messaging.

Alternatively, with the architecture depicted in FIG. 3 and the architecture depicted in FIG. 4, a LINUX VDA implementation, or a custom implementation of DTLS1.2, may provide additional secure communication options.

The architecture depicted in FIG. 4 may result in the UDP framing protocol headers and the initial handshake being unencrypted. This may be similar to TCP headers and a TCP handshake, which may also be unencrypted.

The architecture depicted in FIG. 4 may, in some embodiments, run TLS and DTLS on a same socket. TLS and DTLS may, however, use separate security contexts and session caches, separate handshakes, separate cipher suite configuration, etc.

In some embodiments, an operating system SSL API implementation may be socket based and not buffer based. Furthermore, in some embodiments, SSL/DTLS encryption may be applied directly on top of a socket, and not on top of a buffer provided by a higher-level protocol driver.

Figure 5:
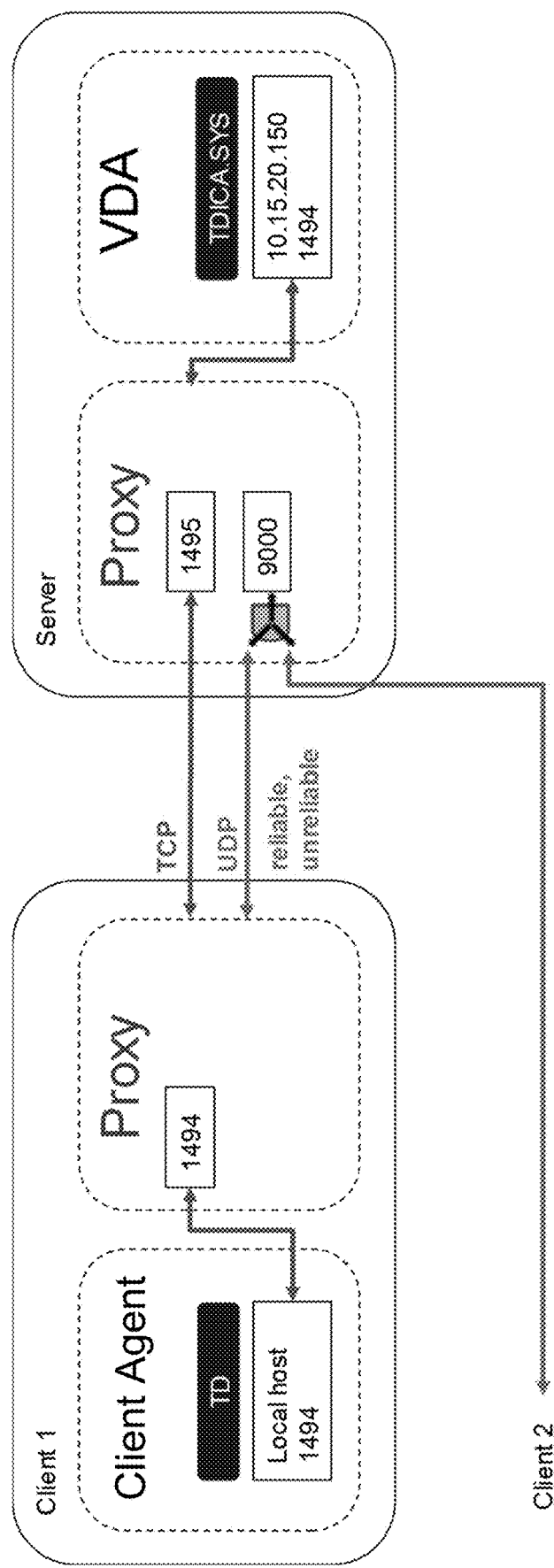
FIG. 5 depicts an example series of connections between a client and a host in accordance with one or more example embodiments.

FIG. 5 depicts an additional implementation for switching transport protocols. Specifically, FIG. 5 depicts an implementation based on transport proxy at a client and/or a host.

The client may use a localhost TCP loopback to connect to a client-side proxy. The localhost TCP loopback may be opaque (e.g., not visible to the client agent). The client-side proxy may connect (e.g., remotely) over TCP and/or UDP to a host-side proxy. The host-side proxy may use a localhost TCP loopback to the host transport driver. The host transport driver may listen on a port (e.g., a TCP port, such as 1494 for ICA).

In some embodiments, multiple UDP flows/sessions can be made to share a single UDP port, thus a firewall can open only one UDP port for all UDP connections. In some embodiments, UDP connections may share ports with TCP connections, which may allow for conveniently open existing TCP ports for UDP.

For example, for XenApp/XenDesktop, the ports that would need to be opened for ICA for both TCP and UDP would be four ports in general: 1494 (raw TCP), 2598 (CGP), 443 (TLS/DTLS), and 8008 (HTML5). A subset of these ports may be opened, depending on the use case.

In other embodiments, a single port may be opened for all protocol combinations. The protocol drivers (parsers) could be port-agnostic. In some embodiments, security and administration motivations may result in separate ports being opened.

Current research shows that there is no performance (e.g., host scalability) impact of port sharing. For a user-mode Windows host implementation, the Microsoft Windows Winsock API may implement port sharing for UDP. A Kernel driver implementation may be hand-crafted to look at different client IP:port combinations and treat UDP packets with the same IP:port as belonging to a single "connection". A new IP:port combination may spawn a new connection thread. Buffer management should not be an issue. The Kernel API may support automatic buffer management and call-backs for data to be read.

In some embodiments, a solution may support overriding the default ICA ports (e.g., 1494, 2598, 443, 8008) at the host and supplying a different port to a client agent via a new ICA file parameter. This may include CBP (Connection Broker Protocol), XenApp/XenDesktop application/desktop Broker, and StoreFront updates. Alternatively, an override UDP port may be supplied to the client agent over TCP as part of the initial ICA handshake over TCP.

In some embodiments, an implementation such as depicted in FIG. 5 may be an expedient option to get quick network performance and UDP port-sharing performance results. For example, the implementation may be introduced quickly because some changes to the client or the host may be avoided. In some embodiments, the implementation depicted in FIG. 5 may be used as a proof-of-concept, staging, and/or testing mechanism.

Figure 6:
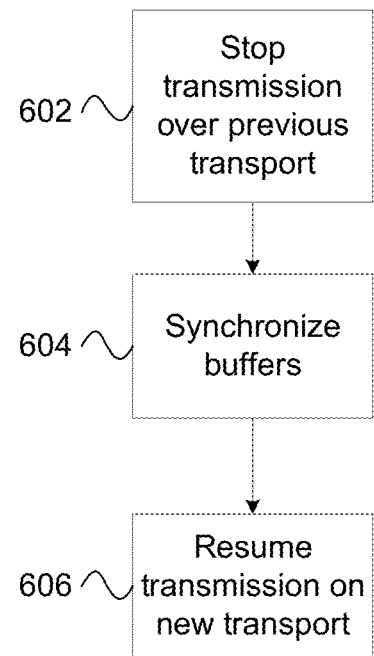
FIG. 6 depicts an illustrative event sequence for switching between different transport protocols in accordance with one or more example embodiments.

FIG. 6 depicts an illustrative event sequence for switching between a first transport protocol and a second transport protocol. For example, a computing device (e.g., a client) may implement an architecture similar to an architecture described herein (e.g., in FIG. 3 or FIG. 4). The computing device may be communicating with a different computing device (e.g., a host) over a first transport protocol (e.g., TCP). In some instances, a second transport protocol may become available (e.g., UDP). Alternatively or additionally, communication over the first transport protocol may break or become unavailable. A CPG layer of the computing device may, in some embodiments, switch from using the first transport protocol to using the second transport protocol.

In step 602, the computing device may stop transmission over the previous transport protocol. For example, if the computing device was communicating with a different computing device using TCP, the computing device may stop communicating with the different computing device using TCP.

In step 604, the computing device and the different computing device may synchronize buffers. For example, the computing device and the different computing device may synchronize buffer acknowledgments for undelivered buffered reliable packets between the computing device and the different computing device. In some instances, buffered data may be assumed to be common for the TCP and UDP transports between the computing device and the different computing device.

In some embodiments, it might not be necessary to attempt to synchronize non-reliable packets. Specifically, non-reliable packets may be packets for which an acknowledgment is not sent or received. Because the computing device will not receive an acknowledgment for an unreliable packet, there is no way to know if an unreliable packet that was sent was actually received. Therefore, synchronizing the buffer acknowledgments for undelivered packets, in some embodiments, may only be performed for reliable packets.

In step 606, the computing device may resume transmission on a new transport. For example, if the previous transport (e.g., in step 602) was TCP, the new transport may be UDP. Alternatively, if the previous transport (e.g., in step 602) was UDP, the new transport may be TCP.

Figure 7:
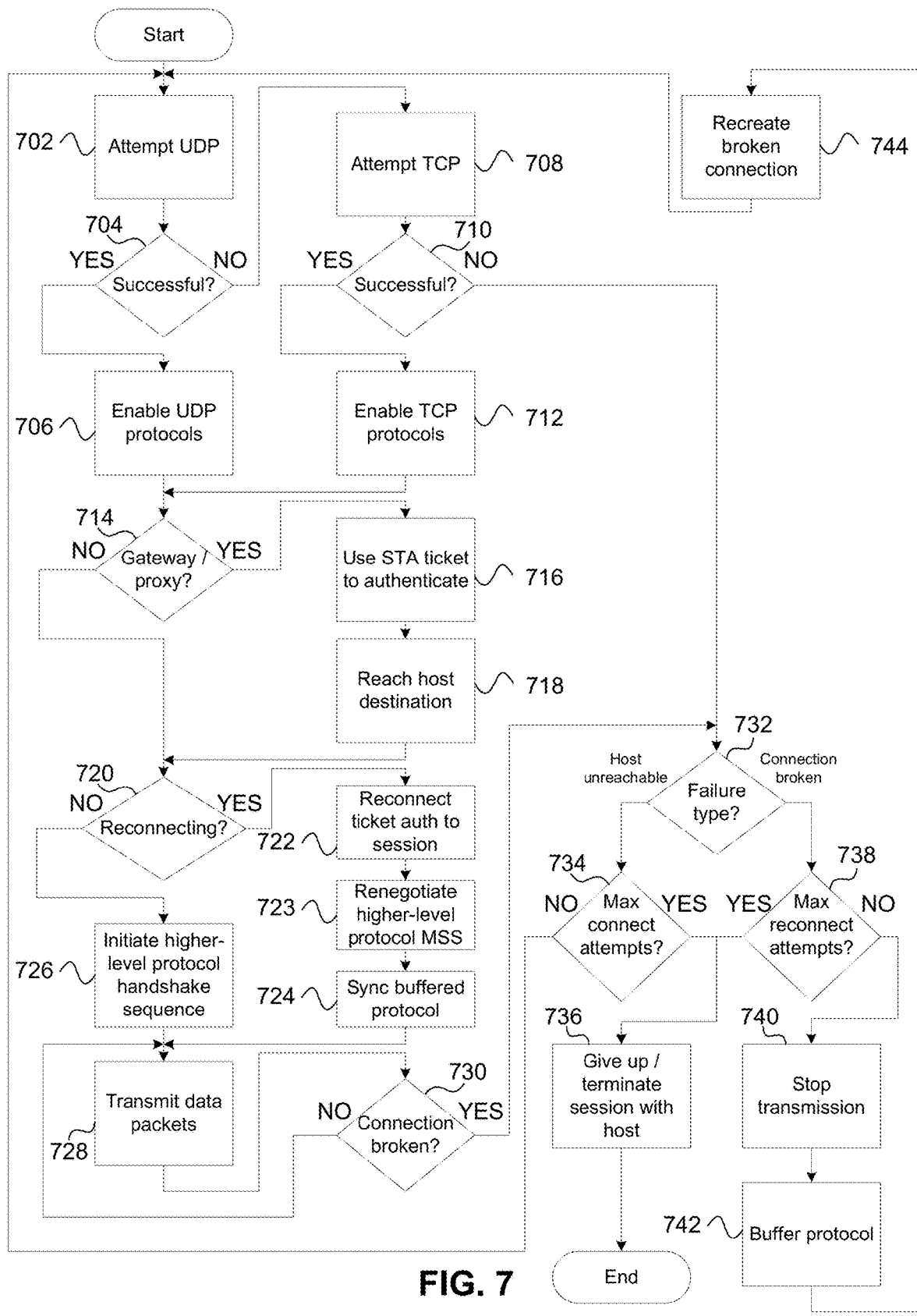
FIG. 7 depicts an illustrative event sequence for switching between different transport protocols in accordance with one or more example embodiments.

FIG. 7 depicts an illustrative event sequence for switching between a first transport protocol and a second transport protocol. In some instances, the sequence depicted in FIG. 7 may be similar to that depicted in FIG. 6, although with additional steps described. In addition, the steps described in FIG. 7 may be performed by a client or a host. If, for example, the steps are performed by a host instead of a client, some of the depicted and/or described steps may differ slightly (e.g., reach client destination instead of reach host destination, determine client unreachable instead of determine host unreachable, etc.).

In step 702, a computing device may attempt to establish a connection using a first transport protocol (e.g., UDP). This attempt to establish a connection may be an attempt to establish an initial connection (e.g., from a client to a configured host destination and port). Alternatively, the attempt to establish a connection may be an attempt to recreate a broken connection (e.g., when CGP with SR is enabled).

In step 704, the computing device may determine whether attempt to establish the connection using the first transport protocol was successful. A timeout on response from the peer may be used to determine unsuccessful connection, e.g., a three-second timeout may be used with UDP.

If the connection over the first transport protocol (e.g., UDP) is successfully established in step 702, the computing device may in step 706 enable and/or configure one or more protocols specific to the first transport protocol (e.g., UDP). One or more of the protocols may be optional or required. The UDP framing layer may compute the Maximum Segment Size (MSS) for transmission. MSS is the largest payload that can be sent in a protocol segment without causing fragmentation. For example, the UDP framing protocol MSS may be computed as the IP MTU, e.g., 1500 bytes by default, minus any protocol header overhead. The protocol header overhead from the optional and required protocols may include overhead of IPv4 (20 bytes) or IPv6 (40 bytes), UDP (8 bytes), optional DTLS (e.g., anywhere between 37 and 93 bytes depending on the cipher suite actually in use with DTLS1.0 or 1.2), and/or any header overhead by the UDP framing protocol itself. The UDP framing protocol MSS may be further reduced to account for IPSec and/or GRE (Generic Routing Encapsulation) tunnels between the computing device and the destination host. The tunnel overhead may be configured via policy. Alternatively, the tunnel overhead may be determined using Path Maximum Transmission Unit (MTU) Discovery (PMTUD). As another alternative, the tunnel overhead may be computed with the help of any gateways or proxies between the computing device and the destination host. For example, a gateway or proxy may modify bits in the UDP framing protocol handshake to indicate the presence and amount of such overhead. Computing a tight upper bound on the UDP framing protocol MSS may improve performance, e.g., to ensure full size packets and to avoid IP fragmentation. In addition, if the optional DTLS is used, IP fragmentation might be avoided, since DTLS might not support IP fragmentation (e.g., as in the DTLS RFC). The algorithm may then proceed to step 714, discussed below.

If the connection over the first transport protocol is not successfully established in step 702, the computing device may in step 708 attempt to establish the connection using a second transport protocol (e.g., TCP). In step 710, the computing device may determine whether attempt to establish the connection using the second transport protocol was successful. A timeout on response from the peer may be used to determine unsuccessful connection, e.g., a 60-second default timeout may be used with TCP. If the connection over the second transport protocol is not successfully established, the algorithm may determine a failure type in step 732, which is discussed in greater detail below. If, in step 708, the connection over the second transport protocol is successfully established, the computing device may in step 712 enable and/or configure one or more protocols specific to the second transport protocol. One or more of the protocols may be optional or required. The TCP layer (layer 4), which may be part of the computing device operating system, may compute its protocol MSS. For example, with an Ethernet MTU of 1500, for TCP the MSS may be 1460 bytes after subtracting 20 bytes for IPv4 and 20 bytes for TCP header. Alternatively, for TCP the MSS may be 1440 bytes after subtracting 40 bytes for IPv6 and 20 bytes for TCP header. For TCP, fragmentation might not be consequential because of Generic Segmentation Offload (GSO) to the Network Interface Controller (NIC).

After the connection using the first or second transport protocol is established, and the corresponding protocols specific to the first or second transport protocol are enabled and/or configured, the computing device may, in step 714, in some embodiments, determine whether the connection is via a remote gateway or proxy. If so, the computing device may, in step 716, use a ticket (e.g., a Secure Ticket Authority (STA) ticket) to authenticate to the remote gateway or proxy. The remote gateway or proxy may contact a STA service to validate the STA ticket. For example, the CGP layer may include a ticket in a CGP capability packet (e.g., if CGP with SR is enabled). Alternatively or additionally, a ticket may be included in a Socket Secure (SOCKS) header (e.g., if CGP is not enabled). After providing the ticket to authenticate, the computing device may obtain a new ticket. The computing device may store the new ticket, and may use the new ticket a next time the computing device reconnects and/or is required to re-authenticate to the remote gateway or proxy.

The STA ticket may be a dual STA ticket. In other words, the STA ticket may contain a reference to two separate STA tickets, each issued by a separate STA service. This may be useful for high availability of the STA services, for example, if one of the STA services goes down or otherwise becomes unavailable, the remote gateway or proxy may validate the other STA ticket with the other STA service. Although not directly illustrated in FIG. 7, if the STA ticket validation fails, the computing device may directly go to step 736 and give up on attempting to establish a connection with the host. In that situation, the computing device might not attempt connection again or fallback from a first transport protocol (e.g., UDP) to a second transport protocol (e.g., TCP), since the STA ticket validation may fail again.

After authenticating, the connection from the computing device may, in step 718, reach the final destination host (e.g., resolved by the host ticket). Although not directly illustrated in FIG. 7, if the final destination host is not reachable from the remote gateway or proxy, e.g., due to UDP being blocked by a firewall, then the gateway or proxy may notify the computing device. For example, the remote gateway or proxy may send CGP protocol informing the computing device that the final destination host is not reachable. The computing device and the remote gateway or proxy may then terminate the already established transport connection between them. The computing device may then fallback from a first transport protocol (e.g., UDP) to a second transport protocol (e.g., TCP), going back to step 708. If the computing device had already attempted a second transport protocol (e.g., TCP) when the final destination host was determined to be unreachable, then the computing device may directly go to step 736 and give up on attempting to establish a connection with the host.

In step 720, the computing device may determine if the connection is an initial connection or an attempt to reconnect to a pre-existing session. If the connection is an attempt to reconnect (e.g., CGP with SR enabled, and the computing device has a reconnect ticket), the computing device in step 722 may authenticate with a reconnect ticket to a host session (e.g., using single sign-on (SSO)). In step 723, the computing device and the destination host may renegotiate the ICA MSS or Maximum Application Payload Size. The renegotiation of the ICA MSS may be performed due to potential switch between transport protocols and their associated required or optional protocols after the initial connection to the session. For example, the initial connection may have been established over first transport protocol (e.g., UDP) and all associated protocols, while the reconnection may be established over second transport protocol (e.g., TCP) and all associated protocols, or vice versa. Computing a tight upper bound on the ICA MSS may be useful in avoiding ICA packet fragmentation, e.g., sending a large ICA packet followed by a small ICA packet, which may adversely affect performance. Further details for computing the ICA MSS are discussed in connection with step 726, below.

In step 724, the computing device may synchronize buffer acknowledgments for one or more (e.g., all) undelivered buffered reliable packets between client and host. The synchronization may be performed for both client-to-host and host-to-client data packets. As part of the synchronization, both the client and the host may send and/or flush buffered reliable packets starting with a next-expected message sequence number in each direction.

If in step 720 the computing device determines the connection is an initial connection, the computing device may, in step 726, initiate a higher-level protocol handshake sequence (e.g., Independent Computing Architecture (ICA)). During the ICA protocol handshake, the computing device and the destination host may negotiate the ICA MSS or Maximum Application Payload Size. For example, the ICA MSS may be computed as the IP MTU 1500 (by default) minus any required or optional protocol header overhead including IPv4 (e.g., 20 bytes) or IPv6 (e.g., 40 bytes), TCP (e.g., 20 bytes) or UDP (e.g., 8 bytes), TLS (e.g., between 26 and 85 bytes, depending on the cipher suite in use with TLS 1.0, TLS 1.1, or TLS 1.2) or DTLS (e.g., between 37 and 93 bytes, depending on the cipher suite actually in use with DTLS 1.0 or 1.2), UDP framing, HTML5, CGP, Reliable-Framing, Secure ICA, etc. The ICA MSS may be further reduced to account for IPSec and/or GRE (Generic Routing Encapsulation) tunnels between the computing device and the destination host, consistent with the MSS computation for the underlying transport protocol. Computing a tight upper bound on the ICA MSS may be useful in avoiding ICA packet fragmentation, e.g., sending a large ICA packet followed by a small ICA packet, which may adversely affect performance. In step 728, the computing device may transmit and receive data packets over the connection. For example, if CGP is enabled, the computing device may transmit and receive ICA over CGP packets. Alternatively, if CGP is not enabled, the computing device may transmit and receive direct ICA packets.

The computing device may monitor the connection; for example, in step 730, the computing device may determine whether the connection is broken (e.g., in a case that CGP with SR is enabled). For example, the computing device may actively determine whether packets are being successfully transmitted and received. Alternatively or additionally, if a threshold number of packets is not successfully transmitted or received for a threshold period of time, the computing device may determine that the connection is broken. For example, if UDP is used as a transport protocol, then the UDP framing protocol layer of the computing device may use a time period (e.g., 25 second timeout) on unacknowledged packets to determine a broken connection. As another example, if TCP is used as a transport protocol, then a default TCP timeout (e.g., 60 seconds) may apply based on the underlying platform socket API. In some embodiments, a particular timeout period (e.g., 60 second timeout) may be considered too long. To ensure consistent user experience in detecting a broken transport connection regardless of the underlying transport protocol, the CGP protocol layer of the computing device may periodically send Keep Alive packets and monitor unacknowledged packets independently of TCP. Thus, the CGP protocol layer may utilize a shorter default timeout period (e.g., 25 seconds), which may be shorter than the default TCP timeout and may be consistent with the timeout used by the UDP framing protocol layer.

In further reference to step 730, if the computing device is already connected via a gateway or proxy, the connection may be disrupted by a failure or overload of the gateway or proxy server. To ensure high availability and smooth failover, the gateway or proxy server may be part of a cluster of server machines, and/or a load balancer may sit in front. When a failover occurs to a new server machine, the computing device may be unaware of the failover and continue to send protocol using the old connection context. If TLS/TCP is used for the connection, the new server machine might not understand the old TLS context used by the computing device. The new server machine may immediately send a TCP reset packet to the computing device. Thus, the computing device may immediately detect the broken connection and trigger reconnection, e.g., with CGP/SR, via the new server machine hosting the gateway or proxy. This may ensure fast failover and good user experience. Similarly, if DTLS/UDP is used for the connection, the new server machine might not understand the old DTLS context used by the computing device. The new server machine may immediately send a DTLS alert message to the computing device. For security reasons, e.g., to avoid potential Denial of Service (DOS) attacks, and since UDP might be easier to spoof than TCP, the computing device may choose to not mark the connection as broken immediately. Instead, the computing device may simply choose to use a shorter UDP framing protocol layer connection timeout. For example, a timeout of 5 seconds may be used as opposed to a default UDP framing protocol layer timeout of 25 seconds. The computing device may choose to treat any undecryptable DTLS packet as a DTLS alert. If a valid decryptable DTLS packet is received before the connection timeout, then the default timeout period may be restored. This may ensure a relatively fast failover with UDP and good user experience without compromising security.

If in step 730 the connection is not broken, the computing device may return to step 728, and continue to transmit and receive data packets.

If in step 730 the computing device determines that the connection is broken, the computing device may, in step 732, determine a failure type of the connection.

If the failure type is that the host is unreachable (e.g., the initial connection attempt to establish a UDP connection in step 702 and the initial connection attempt to establish a TCP connection in step 708 were both unsuccessful), the computing device may, in step 734, determine whether a maximum number of connection attempts has been reached. Alternatively or additionally, the computing device may, in step 734, determine whether a successful connection timeout has been reached. For example, a successful connection timeout of 120 seconds may be used. If the maximum number of connection attempts has not been reached and/or a successful connection timeout has not been reached, the computing device may return to step 702 and attempt to establish a connection using UDP. If the maximum number of connection attempts has been reached and/or a successful connection timeout has been reached, the computing device may, in step 736, give up on attempting to establish a connection with the host.

If, in step 732, the failure type is that the connection is broken, the computing device may, in step 738, determine whether a maximum number of re-connection attempts has been reached. Alternatively or additionally, the computing device may, in step 738, determine whether a successful re-connection timeout has been reached. For example, a successful re-connection timeout of 180 seconds may be used. If the maximum number of re-connection attempts has been reached and/or a successful re-connection timeout has been reached, the computing device may, in step 736, give up on attempting to re-establish the connection with the host. Alternatively or additionally, in step 736, the computing device may terminate a session (e.g., a CGP session) with the host.

If the maximum number of re-connection attempts has not been reached and/or a successful re-connection timeout has not been reached, the computing device may, in step 740, stop protocol transmission above a particular layer (e.g., above the CGP layer). The computing device may, in step 742, continue reliable packet buffering. The buffering may include client-to-host and/or host-to-client data packets. The computing device may, in step 744, attempt to recreate the broken connection. Recreating the broken connection may include attempting to establish the connection via UDP in step 702, and/or attempting to establish the connection using TCP in step 708.

Figure 8:
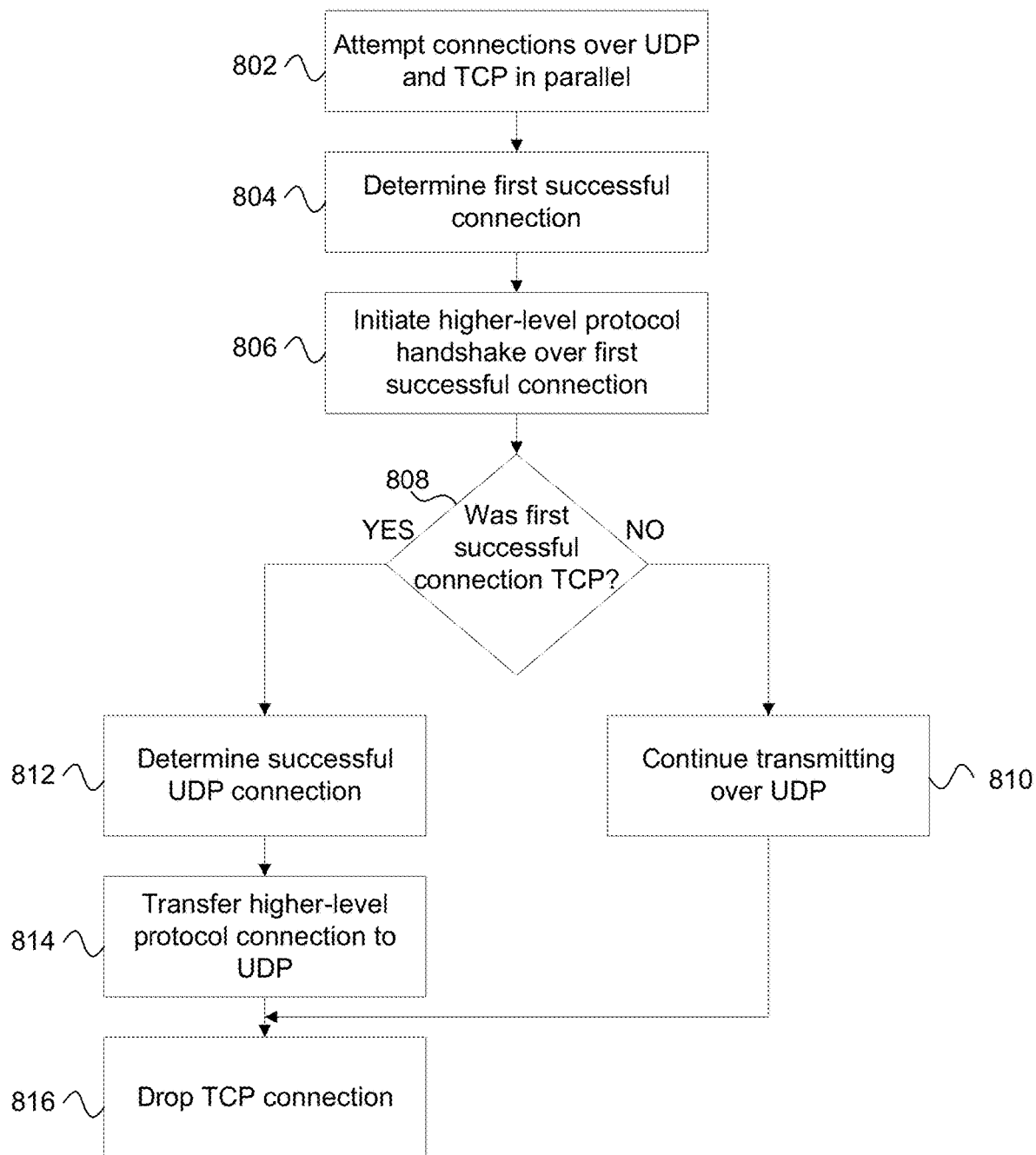
FIG. 8 depicts an illustrative event sequence for establishing a connection using multiple different transport protocols in accordance with one or more example embodiments.

FIG. 8 depicts a flow diagram of an alternative algorithm for establishing a connection. In contrast to FIG. 7—which describes first trying a connection using a first transport protocol (e.g., UDP), then, if the connection is unsuccessful (e.g., UDP is not available), trying a connection using a second transport protocol (e.g., TCP)—the algorithm in FIG. 8 may provide an optimized initial connection time by attempting in parallel to establish connections using multiple different transport protocols.

In step 802, a computing device (e.g., a client, a host) may attempt connections over multiple different transport protocols in parallel. For example, the computing device may attempt a connection over a first transport protocol (e.g., UDP), and attempt a connection over a second transport protocol (e.g., TCP).

In some embodiments, a gateway (e.g., a NetScaler Gateway) may issue two initial tickets (e.g., STA tickets). The first initial ticket may be used for the first connection attempt (e.g., using UDP), and the second initial ticket may be used for the second connection attempt (e.g., using TCP), which may be attempted in parallel, as discussed in step 802. Having two initial tickets may allow a second connection using a second protocol (e.g., UDP) to proceed when a first connection using first protocol (e.g., TCP) may have succeeded first, and is in the exact phase of a handshake (e.g., CGP or SOCKS handshake), but has not yet received a renewed ticket (e.g., STA ticket) from the gateway yet.

Alternatively, in another embodiment, the gateway may only issue a single ticket. The single ticket may be used in establishing the first connection to reach a handshake sequence of a connection attempt. If the second connection reaches the handshake sequence of a connection attempt, the second connection may need to wait until the handshake of the first connection is complete, and a renewed ticket is issued, at which point the second connection may use the renewed ticket to perform the handshake.

In step 804, the computing device may determine a first successful connection. For example, one of the connections may bootstrap more quickly than the other, and therefore may be the first successful connection.

In step 806, the computing device may initiate a higher-level protocol handshake sequence over the first successful connection. For example, one or more protocols specific to TCP or UDP—such as encryption, traversing gateways, traversing proxies, and the like—may be initiated and/or established. Alternatively or additionally, CGP and presentation-level protocols above (e.g., ICA) may be initiated and/or established.

In step 808, the computing device may determine whether the first successful connection was a TCP connection. If the first successful connection was not a TCP connection (e.g., the first successful connection was a UDP connection), then the computing device may, in step 810, continue transmitting over UDP.

In step 808, if the first successful connection was a TCP connection, the computing device may transmit over TCP, but continue to attempt to establish a UDP connection. In step 812, the computing device may determine that the UDP connection was successfully established.

In some embodiments, the computing device may include a watchdog, which may monitor for a UDP connection. The watchdog may periodically monitor if UDP has become available, or if UDP is no longer available (e.g., if no acknowledgements have been received after a threshold amount of time). In some embodiments, TCP may have a separate TCP watchdog and timeouts. The implementation of CGP over TCP may have a separate TCP watchdog. In some embodiments, TCP may break a connection on a timeout. But UDP might not have a connection to break, since UDP may be a "connectionless" protocol. Therefore, a UDP watchdog may be used to determine whether a connection should be considered to be broken or no longer available.

After determining a UDP connection is available, the computing device may switch to UDP. In step 814, the computing device may transfer the higher-level protocol transmission (e.g., established in step 806) to UDP. For example, one or more of authentication, loading user profile, launching initial application(s), negotiating virtual channel protocol(s), etc., may have already been performed over the TCP connection before the UDP connection was available. Thus, in some embodiments, the transfer to UDP from TCP may be attempted at CGP level and above.

In some embodiments, however, some protocols may be specific to TCP or UDP, and therefore cannot be transferred from one to the other. Some communications using those protocols may need to be re-established over the different protocol that is being switched to (e.g., UDP).

The switch between TCP and UDP may require the use of different protocols for traversing proxies, authenticating to gateways, encrypting data, etc. For encryption, SSL/TLS vs. DTLS may be used above TCP and UDP, respectively. For XenApp/XenDesktop, the custom encryption of Secure ICA could still be used for reliable packets sent over TCP or UDP-reliable. For unreliable packets, an AES-based encryption may be used. For gateway or proxy support, CGP or SOCKS may be used for both TCP and UDP-reliable. Once a relay is established, UDP-unreliable may also be transmitted.

For UDP, STUN/TURN may be used for both reliable and unreliable transmissions. STUN/TURN may be beneficial for setting up direct peer-to-peer communication. For XenApp/XenDesktop, there may be a use case with collaboration solutions based on shadowing (shared) ICA sessions. For example, two client agent instances on different client machines sharing a session may optimize multimedia performance (UX and VDA host scalability) by talking peer-to-peer. An additional XenApp/XenDesktop use case may be when the VDA is not directly accessible from NSG. For example, if NSG is in the cloud: Gateway as a service (GWaaS) released as part of Citrix Workspace Cloud (CWC), where both client and VDA are behind NAT firewalls. TURN may be used to go through the firewalls. Alternatively, an existing NSG "on-prem connector" and Control Channel may be extended to tell NSG in the cloud what port to talk to the VDA on, which may allow for CGP/UDP Framing to be used.

In some embodiments, in step 816, after the UDP connection is successfully established and any corresponding protocols established, the computing device may stop the attempt to establish the TCP connection, or drop the TCP connection if it has been established. Alternatively, in some embodiments, the computing device may maintain the TCP connection (e.g., as a fallback or secondary connection, in case the UDP connection has problems or is disconnected).

In some embodiments, the computing device may perform step 814 and step 816 in reverse order. In particular, after determining successful UDP connection in step 812, the computing device may in step 816 drop the TCP connection to the session. Then, in step 814, the computing device may use CGP and its SR mechanism to reconnect and reauthenticate to the disconnected session over the UDP transport connection. This approach may be less complex to implement but may use CGP and may result in a brief interruption of user experience with the hosted session. In addition, for better user experience, the computing device may purposefully hide any SR UI or other kinds of feedback to the user during the switch from TCP to UDP, since the switch might not be a result of unexpected network disruption and failover but a purposeful transport protocol switch performed by the computing device.

Figure 9:
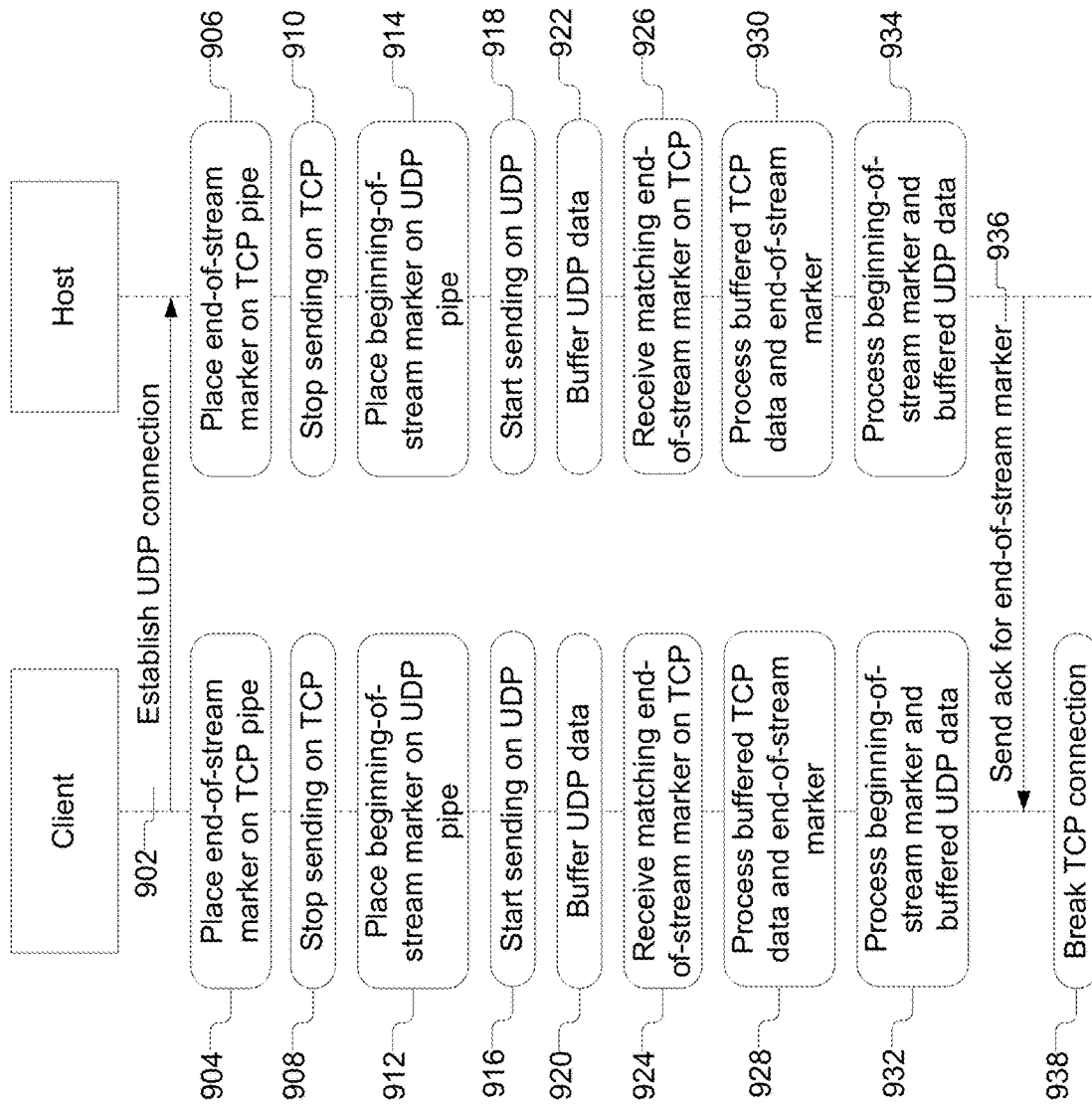
FIG. 9 depicts an illustrative event sequence for switching between different transport protocols in accordance with one or more example embodiments.

FIG. 9 depicts an illustrative flow diagram of a process for transferring between different transport protocols (e.g., TCP and UDP). In some embodiments, a computing device may proactively keep trying to establish a UDP connection after a TCP connection has been established and is still alive. After a UDP connection is established, a transition may be made from the TCP connection to the UDP connection. In some embodiments, such as where voice, video, or other highly-interactive data is being sent, the flow diagram depicted in FIG. 9 may be useful for switching transparently (e.g., less noticeably, such as by avoiding or minimizing an audible or visual break or stutter in an audio or video connection) between different transport protocols (e.g., UDP to TCP, TCP to UDP). FIG. 9 depicts a flow of steps that a client and/or host may engage in to transition between different transport protocols without interrupting a user experience, or higher-layer transmissions.

In step 902, a CGP protocol module may establish a UDP connection to a host, with one or more related protocols on top.

In some embodiments, a flush of the TCP pipe from client to host may be performed. Specifically, in step 904, the client may place an end-of-stream marker on the TCP pipe. In step 908, the client may stop sending data via TCP. In step 912, the client may place a matching beginning-of-stream marker on the UDP pipe. In step 916, the client may start sending data via UDP, beginning with existing CGP packet buffers. In step 922, the host may buffer all data received via UDP, starting with the beginning-of-stream marker, until in step 926 the host receives the matching end-of-stream marker on the TCP pipe. In step 930, the host may process any buffered TCP data, and the end-of-stream marker from the TCP pipe. In step 934, the host may process the beginning-of-stream marker from the UDP pipe, and any buffered UDP data.

In some embodiments, a flush of the TCP pipe from the host to the client may be performed. In some embodiments, the flush of the TCP pipe from the host to the client may be performed substantially in parallel with the flush of the TCP pipe from the client to the host, as described above. In step 906, the host may place an end-of-stream marker on the TCP pipe. In step 910, the host may stop sending via TCP. In step 914, the host may place a beginning-of-stream marker on the UDP pipe. In step 918, the host may start sending via UDP. In step 920, the client may buffer all data received via UDP, starting with the beginning-of-stream marker, until in step 924 the client receives the matching end-of-stream marker on the TCP pipe. In step 928, the client may process any buffered TCP data, and the end-of-stream marker from the TCP pipe. In step 932, the client may process the beginning-of-stream marker from the UDP pipe, and any buffered UDP data.

In step 936, the host may send an acknowledgement for receiving the client-generated end-of-stream marker via UDP, and the client may receive, via UDP, the acknowledgement for receiving the client-generated end-of-stream marker. This may communicate to the client that the host has been able to receive all data previously sent over TCP and that it is safe to close the TCP connection. In step 938, after receiving the acknowledgement, the client may break the TCP connection with the host. Because the client initiates the termination of the TCP connection, in some embodiments the client might not need to send to the host a similar acknowledgement for receiving the host-generated end-of-stream marker. As described above, in step 924 the client may receive the host-generated matching end-of-stream marker on the TCP pipe, which may inform the client that all host-to-client data sent over TCP has already been received.

In some embodiments, an alternative for transferring between different transport protocols (e.g., TCP and UDP) may be implemented by using CGP and its SR mechanism. In particular, after establishing a UDP transport connection to the host as in step 902, the client may directly drop the TCP connection to the host as in step 938. The client may then use CGP and its SR mechanism to reconnect and reauthenticate to the disconnected session over the UDP transport connection. As discussed in the context of FIG. 8, this approach may be less complex to implement but may use CGP and may result in a brief interruption of user experience with the hosted session. In addition, for better user experience, the computing device may purposefully hide any SR UI or other kinds of feedback to the user during the switch from TCP to UDP, since the switch might not be a result of unexpected network disruption and failover but a purposeful transport protocol switch performed by the computing device.

As illustrated above, various aspects of the disclosure relate to switching between different transport protocols. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. One or more non-transitory computer-readable media storing executable instructions that, when executed by at least one processor, cause a system to:
    send, to a computing device via a first connection that uses a first transport protocol, first remote presentation data;
    determine an interruption of the first connection;
    based on the interruption, store second remote presentation data that is unable to be sent to the computing device;
    attempt to establish a second connection to the computing device, wherein the second connection uses a second transport protocol that is different from the first transport protocol;
    based on determining that the attempt to establish the second connection was successful, synchronize, between the system and the computing device, one or more acknowledgement messages for the second remote presentation data; and based on synchronizing the one or more acknowledgment messages, send, to the computing device via the second connection that uses the second transport protocol, third remote presentation data.

2. The one or more non-transitory computer-readable media of claim 1, wherein the first transport protocol is transmission control protocol (TCP), the second transport protocol is user datagram protocol (UDP), and wherein the interruption is associated with a break in the first connection.

3. The one or more non-transitory computer-readable media of claim 1, wherein the executable instructions, when executed by the at least one processor, cause the system to:
change from a third protocol to a fourth protocol based on a change from the first transport protocol to the second transport protocol, wherein the third protocol and the fourth protocol are higher in a stack than the first transport protocol and the second transport protocol.

4. The one or more non-transitory computer-readable media of claim 3, wherein the third protocol is secure sockets layer (SSL), the fourth protocol is datagram transport layer security (DTLS), and the second remote presentation data comprises one or more Independent Computing Architecture (ICA) packets.

5. The one or more non-transitory computer-readable media of claim 3, wherein at least one of the third protocol or the fourth protocol is a custom data-encryption protocol.

6. The one or more non-transitory computer-readable media of claim 1, wherein the executable instructions, when executed by the at least one processor, cause the system to:
before synchronizing the one or more acknowledgement messages, renegotiate a higher-level protocol maximum segment size.

7. The one or more non-transitory computer-readable media of claim 1, wherein the executable instructions, when executed by the at least one processor, cause the system to:
attempt, in parallel, to establish the first connection that uses the first transport protocol and the second connection that uses the second transport protocol, wherein the first remote presentation data is sent via the first connection based on the first connection being established first in time.

8. The one or more non-transitory computer-readable media of claim 1, wherein the executable instructions, when executed by the at least one processor, cause the system to:
determine that the second transport protocol is unavailable;
establish a third connection using the first transport protocol;
after a waiting period, determine that the second transport protocol is available; and
based on determining that the second transport protocol is available:
establish a fourth connection that uses the second transport protocol; and
send, to the computing device, fourth remote presentation data via the fourth connection.

9. The one or more non-transitory computer-readable media of claim 1, wherein the executable instructions, when executed by the at least one processor, cause the system to:
renegotiate a maximum packet size based on switching from the first transport protocol to the second transport protocol.

10. The one or more non-transitory computer-readable media of claim 1, wherein the second transport protocol is selected based on one or more of a fallback setting, a preferred setting, or a default setting.

11. The one or more non-transitory computer-readable media of claim 1, wherein the executable instructions, when executed by the at least one processor, cause the system to:
send a data packet using the second transport protocol, wherein the second transport protocol is an unreliable transport protocol;
generate a ticket corresponding to the data packet, wherein the ticket is accessible to one or more applications; and
determine, based on an acknowledgement state of the data packet, a ticket state of the ticket.

12. The one or more non-transitory computer-readable media of claim 11, wherein determining the ticket state is further based on an acknowledgement state of a custom data-transmission protocol different from the unreliable transport protocol.

13. The one or more non-transitory computer-readable media of claim 1, storing executable instructions that, when executed by at least one processor, cause a system to:
establish, for a first stack of the first transport protocol, a ticket emulation layer that comprises first status information regarding first packets sent using the first transport protocol, wherein the first transport protocol is a reliable protocol; and
establish, for a second stack of the second transport protocol, a ticket layer that comprises second status information regarding second packets sent using the second transport protocol, wherein the second transport protocol is an unreliable protocol.

14. The one or more non-transitory computer-readable media of claim 13, wherein the executable instructions, when executed by the at least one processor, cause the system to:
receive, from a virtual channel, a request for a status of a particular packet;
determine, from the ticket layer or the ticket emulation layer, the status of the particular packet; and
return the status of the transmission of the particular packet.

15. The one or more non-transitory computer-readable media of claim 13, wherein the executable instructions, when executed by the at least one processor, cause the system to:
based on the interruption of the first connection, transfer, from the ticket emulation layer to the ticket layer, ticket information that indicates a status of the first packets.

16. The one or more non-transitory computer-readable media of claim 14, wherein the virtual channel is an enlightened virtual channel, and
wherein the executable instructions, when executed by the at least one processor, cause the system to:
based on the status of the particular packet, determine whether to retransmit the particular packet, transmit a new superseding packet, or do nothing.

17. The one or more non-transitory computer-readable media of claim 14, wherein the request for the status of the particular packet is directed to a first of the ticket layer or the ticket emulation layer, and the status of the particular packet is determined from a second of the ticket layer or the ticket emulation layer.

18. The one or more non-transitory computer-readable media of claim 1, wherein the first remote presentation data is associated with a first port of the computing device, wherein the third remote presentation data is associated with the first port of the computing device, and wherein the first port is associated with a reliable transport protocol.

19. A system comprising:

at least one processor; and memory storing executable instructions that, when executed by at least one processor, cause the system to:

send, to a computing device via a first connection that uses a first transport protocol, first remote presentation data;

determine an interruption of the first connection;

based on the interruption, store second remote presentation data that is unable to be sent to the computing device;

attempt to establish a second connection to the computing device, wherein the second connection uses a second transport protocol that is different from the first transport protocol;

based on determining that the attempt to establish the second connection was successful, synchronize, between the system and the computing device, one or more acknowledgement messages for the second remote presentation data; and based on synchronizing the one or more acknowledgement messages, send, to the computing device via the second connection that uses the second transport protocol, third remote presentation data.

20. A method comprising:

sending, by a first computing device and to a second computing device via a first connection that uses a first transport protocol, first remote presentation data;

determining, by the first computing device, an interruption of the first connection;

based on the interruption, storing, by the first computing device, second remote presentation data that is unable to be sent to the second computing device;

attempting, by the first computing device, to establish a second connection to the second computing device, wherein the second connection uses a second transport protocol that is different from the first transport protocol;

based on determining that the attempt to establish the second connection was successful, synchronizing, between the first computing device and the second computing device, one or more acknowledgement messages for the second remote presentation data; and based on synchronizing the one or more acknowledgement messages, sending, by the first computing device and to the second computing device via the second connection that uses the second transport protocol, third remote presentation data.

* * * * *